United States Patent [19]

Pearce et al.

[11] 4,004,473
[45] Jan. 25, 1977

[54] BROAD RANGE FLUID AND MECHANICAL POWER TRANSMISSION FOR VEHICLES OR THE LIKE

[75] Inventors: Shairyl I. Pearce, East Peoria; Gerald B. Ireland, Morton; Willis E. Windish, Pekin, all of Ill.

[73] Assignee: Caterpillar Tractor Co., Peoria, Ill.

[22] Filed: Nov. 29, 1973

[21] Appl. No.: 420,063

[52] U.S. Cl. .................................. 74/759; 74/763; 74/730
[51] Int. Cl.² .................. F16H 57/10; F16H 47/00
[58] Field of Search ........... 74/763, 759, 688, 731, 74/732, 753, 758, 762

[56] References Cited

UNITED STATES PATENTS

| | | | |
|---|---|---|---|
| 2,562,464 | 7/1951 | Jandasek | 74/763 X |
| 2,606,460 | 8/1952 | Kelley | 74/763 X |
| 2,725,763 | 12/1955 | Stoeckicht | 74/763 |
| 2,737,827 | 3/1956 | Seybold | 74/763 X |
| 2,748,622 | 6/1956 | Syrovy et al. | 74/763 |
| 2,873,625 | 2/1959 | Simpson | 74/763 |
| 2,914,967 | 12/1959 | Simpson | 74/763 X |
| 3,287,995 | 11/1966 | Leonard et al. | 74/763 |
| 3,347,113 | 10/1967 | Ramsel | 74/688 |
| 3,354,752 | 11/1967 | General et al. | 74/763 |
| 3,355,967 | 12/1967 | Moan | 74/688 |
| 3,541,886 | 11/1970 | Bookout | 74/763 |
| 3,557,636 | 1/1971 | Dangauthier | 74/732 |
| 3,610,071 | 10/1971 | Tuck | 74/759 |

*Primary Examiner*—Samuel Scott
*Assistant Examiner*—Lance W. Chandler
*Attorney, Agent, or Firm*—Phillips, Moore, Weisenberger, Lempio & Strabala

[57] ABSTRACT

A compact combination of planetary gear sets together with a torque converter and drive conditioning clutches and brakes provides for a broad range of output speeds in either mechanical or converter drive with a nearly constant small step ratio between speeds and with a relatively small variation of transmitted power throughout a very broad range of output speeds.

1 Claim, 4 Drawing Figures

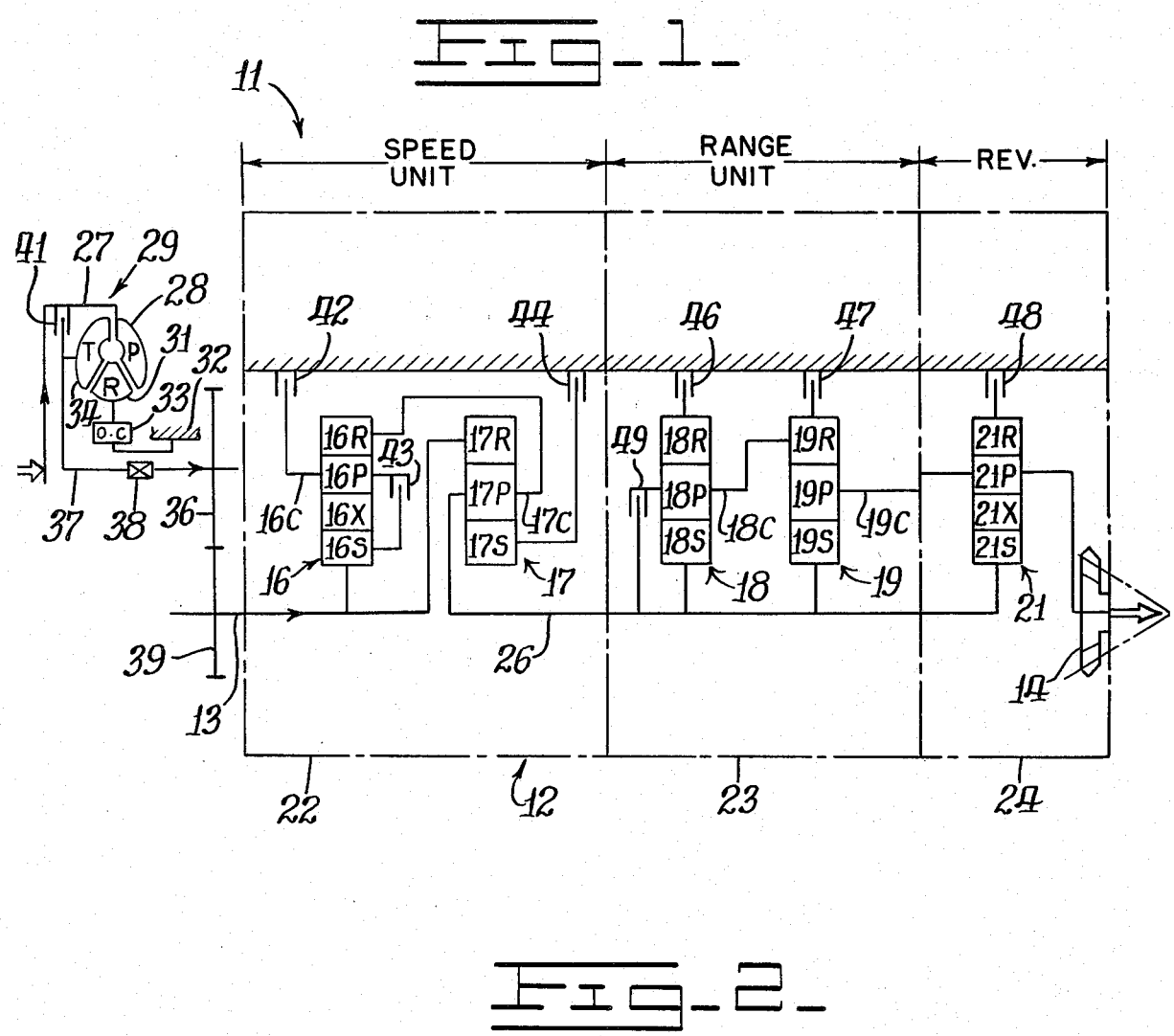

BROAD RANGE FLUID AND MECHANICAL POWER TRANSMISSION FOR VEHICLES OR THE LIKE

BACKGROUND OF THE INVENTION

This invention relates to transmissions for coupling an engine to the wheel drive line of a vehicle or other driven mechanism and more particularly to transmissions of the type having a torque converter and planetary gear sets for providing a plurality of drive ratios including both fluid and mechanical drive.

Vehicle transmissions enable a broad range of vehicle ground speeds to be realized while the engine is operated within the relatively narrower range of engine speeds at which engine power output is sufficiently high to match the existing load. Thus, subject to practical limitations discussed below, optimum power performance requires that a transmission provide a large number of different drive ratios or transmission speeds. Step ratios between the successive speed ratios should be small and preferably uniform. However, providing for a large number of drive ratios with known techniques tends to add to the bulk, complexity and cost and aggravates certain undesirable performance characteristics. Adding additional gear sets for this purpose increases inertia and friction losses and control is complicated in that more frequent shifting becomes necessary.

Practical transmission designs are usually a compromise between these conflicting considerations. In the interest of simplicity, compactness, economy and ease of control, vehicle transmissions usually provide less than the theoretically optimum number of drive ratios. Further, practical limitations to the relative proportions which may be provided for the gears of a particular transmission design have usually dictated that step ratios between successive drive ratios be somewhat nonuniform and frequently undesirable power reductions are present at one or more specific drive ratios or at transition points between successive drive ratios. These power gaps occur where the gears involved in a particular drive ratio must of necessity provide less than the most efficient ratio match between engine speed and the existing vehicle speed and where the next higher or lower drive ratio is subject to similar limitations at that vehicle speed.

Considering now another transmission characteristic, drive may be purely mechanical through coupled shafts, gears, and the like or may be partly fluid drive by connection of a torque converter into the power path. Mechanical drive has the advantage of being potentially more efficient from the standpoint of power loss but has the disadvantage that repeated shifting of the transmission is necessary to maintain high power throughout if the vehicle speed is changing rapidly or if the vehicle is subjected to a widely varying load. Fluid drive through a torque converter is subject to greater power losses but has a much broader torque range capability. With the torque converter in the power path, the power throughput remains reasonably high for a relatively broad range of vehicle speeds and loads and thus less shifting is needed. Accordingly it is advantageous to provide for selection of either wholly mechanical drive or fluid drive over as broad a range of vehicle speeds as is practical.

Because of the various different desirable performance characteristics and other considerations discussed above, practical transmission designs are always a compromise between conflicting requirements. Prior U.S. Pat. No. 3,347,113 issued to C. A. Ramsel Oct. 17, 1967 discloses a transmission having four forward drive planetary gear sets, an additional planetary gear set for reverse, a torque converter, and which provides highly desirable performance characteristics in terms of the factors discussed above if utilized in certain particular types of vehicle. The transmission of prior U.S. Pat. No. 3,347,113 was designed for use in scrapers of the kind used in earthmoving operations and provides the broad torque capability of fluid drive at a wide range of very low vehicle speeds, at which loading of the scraper occurs, while providing six forward speed ratios of highly efficient mechanical drive at the high ground speeds at which hauling of a load takes place with fairly uniform small step ratios between the six forward mechanical drive speeds. In such a vehicle the broad torque capability at very low speeds is extremely important and is gained at some sacrifice of power transmission efficiency. Power performance at ground speeds slightly above loading speed but below normal hauling speeds is less critical and less than maximum efficiency at these speeds can be accepted. However, this does not apply to many other types of vehicles, such as automotive trucks, wherein a transmission of that general type might be useful. If a transmission of the general type described in prior U.S. Pat. No. 3,347,113 is to be employed in heavy trucks or the like, it is preferable that the available range of efficient mechanical drive be extended to lower vehicle speeds and that converter drive be optional rather than compulsory at intermediate speeds.

While such an extension of the highly efficient mechanical drive range to lower vehicle speeds might be achieved by the addition of more planetary gear sets using known tehcniques, this would involve an undesirable increase in the bulk, complication and cost of the transmission and would increase inertia and friction losses. The problem is further complicated in that it is desirable to avoid imposing increased torque loads on the transmission components as this necessitates an undesirably massive construction for such components. For a given power input, torque loads are an inverse function of speed. Thus a high degree of speed reduction in one part of the gearing system imposes correspondingly high torque loads on the following parts of the system and limit maximum power transmitted.

SUMMARY OF THE INVENTION

This invention is a transmission utilizing four planetary gear sets and a torque converter to provide seven different ratios of highly efficient forward mechanical drive covering a broad range of output speeds including low output speeds with nearly uniform small step ratios while providing optional torque converter drive at any speed. An additional planetary gear set provides for reverse drive. Power throughput may be high without imposing severe torque loads on the gearing system.

Accordingly, it is an object of this invention to provide a compact, economical and highly efficient transmission of the form having a torque converter and a planetary gearing system.

The invention together with other objects and advantages thereof will best be understood by reference to the following description of a preferred embodiment taken in conjunction with the accompanying drawings.

BRIEF DESCRIPTION OF THE DRAWINGS

In the accompanying drawings:

FIG. 1 is a schematic diagram of a transmission embodying the invention,

FIG. 2 is a chart showing the particular clutches and brakes which are engaged in the transmission of FIG. 1 to establish the several different drive ratios provided thereby and showing speed reductions provided therein at the several drive ratios together with the ratio steps between successive drive ratios.

DESCRIPTION OF A PREFERRED EMBODIMENT

Figure 3:
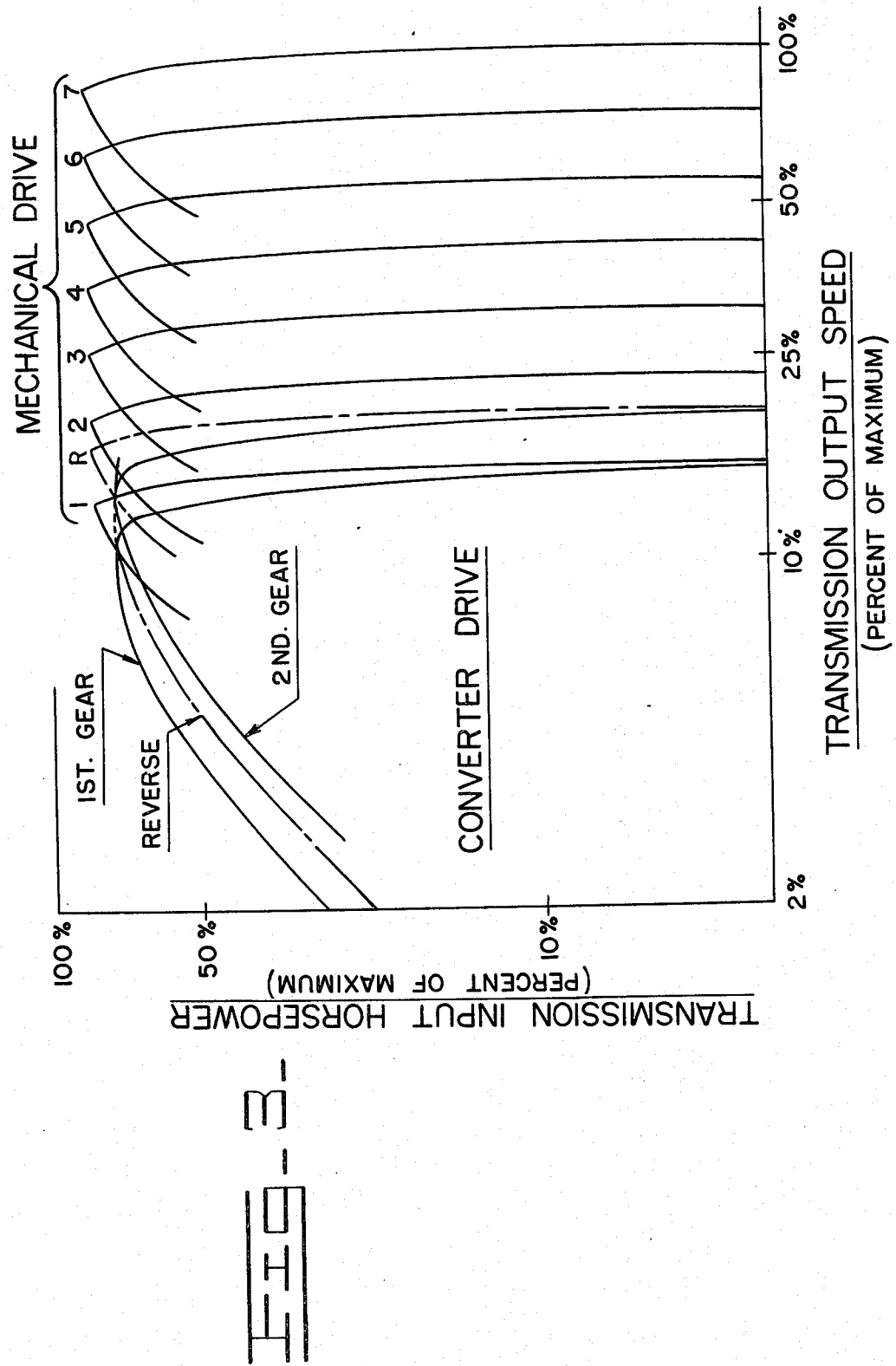
FIG. 3 is a graphical illustration of performance characteristics of the transmission of FIG. 1 wherein the percentage of maximum engine power output which is transmitted is plotted as a function of transmission output speed which in a vehicle corresponds essentially to ground speed.

Referring initially to FIG. 1 of the drawing, a transmission 11 in accordance with the invention has a planetary gearing system 12 with a rotatable input shaft 13 and a rotatable output element which is a gear 14 in this example and which includes five planetary gearing sets 16, 17, 18, 19 and 21.

As will hereinafter be discussed in more detail, the planetary gearing system 12 may be considered, in terms of functions, as consisting of three units connected in tandem. A speed unit 22 includes gear sets 16 and 17, a range unit 23 includes gear sets 18 and 19 and a reverse unit 24 includes gear set 21. A single mainshaft 26 serves both as the output of speed unit 22 and the input to range unit 23 and reverse unit 24. Speed unit 22 provides for selection of any of three different drive ratios between the input shaft 13 and mainshaft 26, while the range unit 23 provides for selection of any of an additional three drive ratios between the main shaft 26 and the output gear 14. Thus, by utilizing different combinations of the drive ratios available in speed unit 22 and in range unit 23, a large number of different drive ratios may be realized through the planetary gearing system 12 as a whole.

Rotary drive from the engine of the vehicle or other power source is transmitted to input shaft 13 through a rotatable member 27 coupled to the pump element 28 of a torque converter 29. The reaction member 31 of the torque converter is grounded to stationary structure 32 through an overrunning clutch 33. The turbine element 34 of the torque converter is coupled to a first transfer gear 36 through a rotatable member 37 and a universal joint 38. The first transfer gear 36 is drivingly engaged with a second and smaller diameter transfer gear 39 on the input shaft 13. Owing to the difference in diameters of the transfer gears 36 and 39 an initial speed increase is provided between the driving engine and the input to the planetary gearing system 12.

In order to provide for selection of either fluid drive through the torque converter 29 or purely mechanical drive, a lock-out clutch 41 enables selective direct engagement of rotatable member 37 to member 27. Thus, with clutch 41 disengaged, drive to the planetary gearing system 22 is through the torque converter while upon engagement of clutch 41 the converter is by-passed and purely mechanical drive to the planetary gearing system is established.

Considering now the planetary gearing within speed unit 22, gear set 16 is of the form having sun gear 16S and a ring gear 16R. A secondary planet gear 16X is engaged with the sun gear 16S and also with a primary planet gear 16P mounted on a carrier 16C and which engages the ring gear. It will be appreciated by those skilled in the art that in the planetary gear set 16 and the other planetary gear sets to be described, it is usually preferable to employ more than one of each planet gear to better distribute torque loads although only a single one of each planet gear is represented in the schematic diagram of FIG. 1.

The other planetary gear set 17 of the speed unit is of the form having a sun gear 17S engaging a planet gear 17P which in turn engages a ring gear 17R. Ring gear 17R is coupled to the input shaft 13 for rotation therewith while the planet carrier 17C is coupled to the ring gear 16R of the first planetary set 16 for rotation therewith.

A brake 42 provides for selectively locking the carrier 16C against rotation while a clutch 43 is provided to selectively lock carrier 16C to sun gear 16S for synchronous rotation therewith. Still another brake 44 provides for selectively clamping sun gear 17S against rotation.

Analysis of the above described speed unit gearing system, will show that upon selective engagement of brake 42, a substantial speed reduction is realized between the input shaft 13 and main shaft 26. With brake 42 actuated, carrier 16c is locked against rotation and therefore sun gear 16S rotates secondary planet ger 16X which in turn rotates primary planet gear 16P. Planet gear 16P then drives ring gear 16R and the rotation of the ring gear is transmitted to mainshaft 26 through carrier 17C. Rotation of the mainshaft is in the same direction as that of the input shaft 13 but at a substantially reduced speed owing to the substantial difference in diameters of the sun gear 16S and ring gear 16R.

Engagement of brake 44 produces a lesser speed reduction between input shaft 13 and mainshaft 26. With brake 44 engaged, sun gear 17S is locked against rotation and the rotation of ring gear 17R then forces the planet gear 17P to orbit around sun gear 17S and this motion is transferred to the mainshaft 26 through carrier 17C.

Engagement of the clutch 43 produces direct or one-to-one drive between the input shaft 13 and mainshaft 26. With clutch 43 engaged, gear set 16 is locked up to rotate as a unit with the input shaft 13 and this motion is transmitted to the mainshaft 26 through carrier 17. Thus, the speed unit 22 as a whole provides for a direct or one-to-one drive, an underdrive and a still greater underdrive depending on whether the clutch 43 or brakes 44 or 42 respectively are engaged. Lockout clutch 41 enables any of these drives to be selectively either a fluid drive or a purely mechanical drive.

The range unit 23 and reverse unit 24 of the planetary gearing system 12 are, considered separately, of known construction as exemplified by the corresponding portions of the transmission of the hereinbefore identified U.S. Patent 3,347,113. In such a range unit and reverse unit, all sun gears 18S, 19S and 21S are carried on the mainshaft 26 for rotation therewith. The ring gears 18R, 19R and 21R of each of the three gear sets are provided with brakes 46, 47 and 48 respectively for selectively locking any individual one of the ring gears against rotation. Gear set 18 has a planet gear 18P mounted on a carrier 18C and engaged with both sun gear 18S and ring gear 18R, with the carrier 18C being coupled to ring gear 19R. A clutch 49 provides for selectively clamping carrier 18c to mainshaft 26 for synchronous rotation therewith. Gear set 19 has a planet gear 19P engaged with both sun gear 19S and ring gear 19R while the reverse gear set 21 has a secondary planet gear 21X engaged with sun gear 21S and engaged with a primary planet gear 21P. Planet gear 21P in turn engages the ring gear 21R. Both planet gear 19P of gear set 19 and planet gear 21P of reverse gear set 21 are supported on a single carrier 19C which is drivingly coupled to the transmission output gear 14.

Accordingly, three speed ranges or drive ratios may be realized between the mainshaft 26 and the output element, carrier 19C of the range unit 23. A high gear ratio is achieved by engaging clutch 49 as both gear sets 18 and 19 are thereby locked up to rotate in synchronism with the mainshaft 26 and this rotation is transferred to the output gear 14 through carrier 19C, the drive ratio through the range unit thereby being one-to-one or direct. An intermediate speed range is effected by engaging brake 46. With ring gear 18R thus clampled against rotation, planet gear 18P is forced to orbit therein with the orbital motion being transferred to the output gear 14 through carriers 18C and 19C. Low speed range is effected by engaging brake 47, thereby causing planet gear 19P to orbit within the ring gear with the motion being transmitted to the output gear 14 through carrier 19C. The difference in the drive ratios provided in the intermediate and low ranges is established by forming sun gear 18S to have a larger diameter relative to that of ring gear 18R than sun gear 19S has relative to ring gear 19R.

Reverse gear set 21 is of the form having a sun gear 21S rotatable with mainshaft 26 and driving a secondary planet gear 21X which engages a primary planet gear 21P. Planet gear 21P is in turn drivingly engaged with ring gear 21R which may be selectively stopped by actuation of a reverse brake 48. With brake 48 engaged, planet gear 21P is constrained to orbit within ring gear 21R in a direction counter to the rotation of the mainshaft 26 and sun gear 21S. The counter rotation is transmitted to the output gear 14 through planet carrier 19C.

Referring now to FIG. 2 in conjunction with FIG. 1, the three forward gear ratios available within the speed unit 22 could in theory be combined with the three ratios available within the range unit 23 to realize nine distinct gear ratios through the transmission as a whole, in addition to neutral and three reverse gear ratios by selectively actuating appropriate pairs of the clutches or brakes. However, in most vehicles it is sufficient to utilize not more than seven of the theoretically available forward ratios and this has the advantage that the component gears of the system described above can readily be proportioned to provide nearly uniform steps between successive drive ratios without requiring excessive differences in diameter of engaged gears and without creating severe torque loads at any point in this system. For example, gear set 16 may, without mechanical difficulty, be proportioned to provide a speed reduction of two within the speed unit 22 when brake 42 is engaged. Gear set 17 may be proportioned to provide a speed reduction of 1.35 while a one to one ratio is available by actuation of clutch 43. Similarly, gear set 19 of the range unit can readily be proportioned to provide a range unit speed reduction of 3.30 while gear set 18 provides a range unit speed reduction of 1.82 and a one-to-one range unit drive ratio is available by engaging clutch 49. Thus, by engaging brakes 42 and 47 simultaneously, an overall speed reduction of 6.60 is realizable and by simultaneously engaging brake 44 and 47, a second forward speed with a lesser overall speed reduction of 4.45 is obtained. Similarly, by engaging other pairs of the clutches and brakes, progressively smaller speed reductions are accomplished ending in a one-to-one or direct drive through the entire planetary gearing system 12 in the seventh forward speeds. As shown in FIG. 2, the steps between the overall speed reductions in the seven forward speeds may be substantially uniform, the step ratio being 1.35 for all drive ratio transitions other than that between the first and second forward speeds at which the step ratio is 1.48. The planetary gearing configuration described above accomplishes this without involving unacceptable pitch diameter differences between meshing gears and without creating excessively high torque loads at any point in the gearing system.

In many vehicles, only a single reverse drive ratio is needed and in the present example, this is provided for by engagement of brakes 42 and 48 to establish an overall reverse drive ratio intermediate between that of the first and second forward gears.

Referring now to FIG. 3 in conjunction with FIG. 1, it may be seen that the range of available purely mechanical drive extends from 100% of maximum output speed down to less than 10% of maximum speed with high efficiency of power throughput throughout this range. Use of the torque converter drive, wherein power transmitting efficiency is less, but variable torque capability is much greater is required only at extremely low output speeds, although it is available at any speed where operating conditions make broad torque capability more important than high efficiency.

Figure 4:
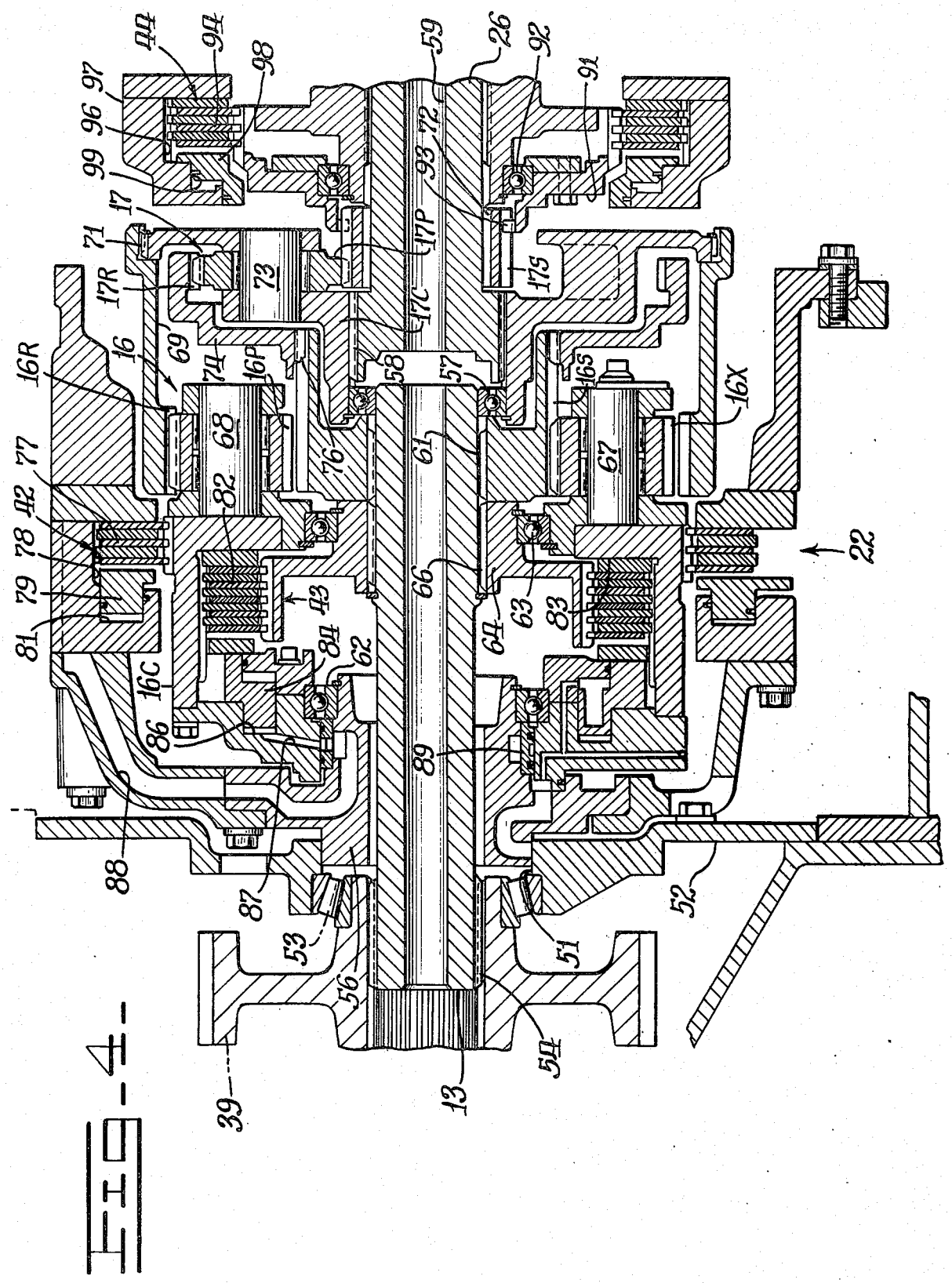
FIG. 4 is an axial section view through a portion of the transmission shown schematically in FIG. 1 showing a suitable detailed construction therefor.

Considering now a suitable detailed mechanical construction for the speed unit 22 of the planetary gearing system 12, reference should be made to FIG. 4. Input shaft 13 may extend through a front opening 51 in a transmission housing 52. The larger diameter transfer gear 39 is journaled in the opening 51 by a bearing 53 and is disposed coaxially on the forward end of the input shaft and is coupled thereto by splines 54. Input shaft 13 extends through a stationary member 56 at the front end of the gearing system with the rearward end of the input shaft being journaled in planet carrier 17C by an additional bearing 57. Mainshaft 26 extends along the same rotary axis as the input shaft 13 and has a forward end coupled to planet carrier 17C by splines 58. Shafts 13 and 26 are provided with an axial bore 59 in this example since an automatic transmission control system of the form disclosed in prior U.S. Pat. No. 3,452,621, issued July 1, 1969 to K. F. Golan et al may be employed with the present transmission and the bore 59 provides for disposition of a governor drive rod along the axis of the system to connect with the output element of the transmission. Sun gear 16S may be disposed coaxially on the rearward portion of input shaft 13 and may be rotationally coupled thereto by splines 61. Planet carrier 16C is disposed coaxially around the central portion of input shaft 13 and is supported at the forward end on stationary member 56 by a bearing 62 and at a more rearward point by an additional bearing 63 disposed coaxially on a clutch hub 64 which is in turn rotationally coupled to the input shaft by splines 66. Secondary planet gears 16X are mounted on axles 67 extending from the planet carrier 16C and engage both sun gear 16S and the primary planet gears 16P which are supported on additional axles 68 extending from the planet carrier 16C. The ring gear 16R is coaxial with the input shaft 13, engages each of the primary planet gears 16P and has a rearward sleeve extension 69 coupled to planet carrier 17C through splines 71.

Sun gear 17S of gear set 17 is disposed coaxially with respect to the forward portion of mainshaft 26 and spaced there from by a gap 72 in order to be rotatable relative to the mainshaft while the associated planet carrier 17C is coupled to the forward end of mainshaft 26 by the previously described adjacent set of splines 58 for rotation therewith. Planet gears 17P are supported on carrier 17C by axles 73 in position to engage both the sun gear 17S and the encircling ring gear 17R. To form the previously described driving connection between ring gear 17R and input shaft 13, the ring gear has a forward extension 74 rotationally coupled to sun gear 16S by further splines 76.

Brake 42 in this example is formed by a series of annular brake disks 77 encircling planet carrier 16C and which are spline coupled thereto for rotation therewith. Brake disks 77 extend into an annular cavity 78 in stationary member 56 and an annular brake piston 79 is situated at one end of the civity. Thus, by admitting pressurized fluid to a chamber 81 behind piston 79, the piston may be caused to exert pressure on the brake disks to clamp carrier 16C to stationary member 56, the automatic control system of prior U.S. Pat. No. 3,452,621 being one suitable system for supplying fluid pressure when the brake is to be engaged.

Clutch 43 may consist of a plurality of clutch disks 82 splined connected to hub 64 for rotation therewith and extending into a chamber 83 formed in carrier 16C. A moveable annular piston 84 is disposed adjacent disks 82 and may be shifted to clamp the disks against the carrier 16C by admission of fluid pressure to a chamber 86 behind the piston through a passage 87 in the carrier which communicates with a passage 88 in stationary member 56 through a rotating seal 89.

Brake 44 may be formed of an annular brake hub 91 supported in coaxial relationship to mainshaft 26 by a bearing 92 and which is rotationally coupled to sun gear 17S by splines 93. Annular brake disks 94 are disposed coaxially on hub 91 and are spline coupled thereto. Brake disk 94 extends into a cavity 96 formed in an additional stationary element 97 and a slidable piston 98 is disposed at one side thereof whereby the brake disk 94 and thus the hub 91 and sun gear 17S may be locked against rotation by admission of pressurized fluid to a chamber 99 behind the piston.

While the invention has been described with respect to a single embodiment, it will be apparent that many modifications are possible and it is not intended to limit the invention except as defined in the following claims.

What is claimed is:

1. A transmission for connection between an engine and mechanism driven thereby comprising:
   a transmission housing,
   an input shaft, a mainshaft and an output element,
   a torque converter having a pump element with means for receiving drive from said engine and having a turbine element coupled to said input shaft, and lock-out means for selectively locking said means for receiving drive from said engine to said means for driving said input shaft to bypass said torque converter,
   a range unit planetary gearing means connected between said mainshaft and said output element and having first and second planetary gearsets and first and second brake means and a first clutch means for conditioning said gearsets to provide any selected one of a plurality of drive ratios between said mainshaft and said output element, and
   a speed unit planetary gearing means connected between said input shaft and said mainshaft and having a third planetary gearset which has a ring gear coupled to said input shaft for rotation therewith and a sun gear and at least one planet gear supported on a carrier which is coupled to said mainshaft for rotation therewith and a third brake means for selectively locking said sun gear against rotation, said speed unit planetary gearing means further having a fourth planetary gearset with a sun gear coupled to said input shaft for synchronous rotation with said input shaft and with said ring gear of said third planetary gearset, and a ring gear coupled to said carrier of said third planetary gearset to rotate synchronously therewith, and at least one secondary planet gear engaged with said sun gear of said fourth planetary gearset and at least one primary planet gear engaged with said secondary planet gear and also being engaged with said ring gear thereof, a fourth planetary gearset carrier supporting said primary and secondary planet gears, fourth brake means coupled between said fourth planetary gearset carrier and said housing for selectively locking said primary and secondary planet gears against orbital motion around said sun gear of said fourth planetary gearset, and second clutch means for locking up said speed unit planetary gearing means to cause said input shaft and said mainshaft to turn in synchronism, said second clutch means being coupled between said carrier and sun gear of said fourth planetary gearset.

* * * * *